Jan. 1, 1924

I. SHORT

BEARING FOR GEARING

Filed Dec. 20, 1921

1,479,157

Ira Short
INVENTOR

WITNESSES:

BY
ATTORNEY

Patented Jan. 1, 1924.

1,479,157

UNITED STATES PATENT OFFICE.

IRA SHORT, OF ESSINGTON, PENNSYLVANIA, ASSIGNOR TO WESTINGHOUSE GEAR AND DYNAMOMETER COMPANY, A CORPORATION OF PENNSYLVANIA.

BEARING FOR GEARING.

Application filed December 20, 1921. Serial No. 523,673.

*To all whom it may concern:*

Be it known that I, IRA SHORT, a citizen of the United States, and a resident of Essington, in the county of Delaware and State of Pennsylvania, have invented a new and useful Improvement in Bearings for Gearing, of which the following is a specification.

My invention relates to shaft bearings and more particularly to bearings for the shafts of transmission gearing of the double helical or herring-bone type, and it has for an object to provide apparatus of the character designated which shall serve to permit rocking or tilting of one of two meshing gears whereby even distribution of tooth pressures may be automatically effected.

Figure 1:
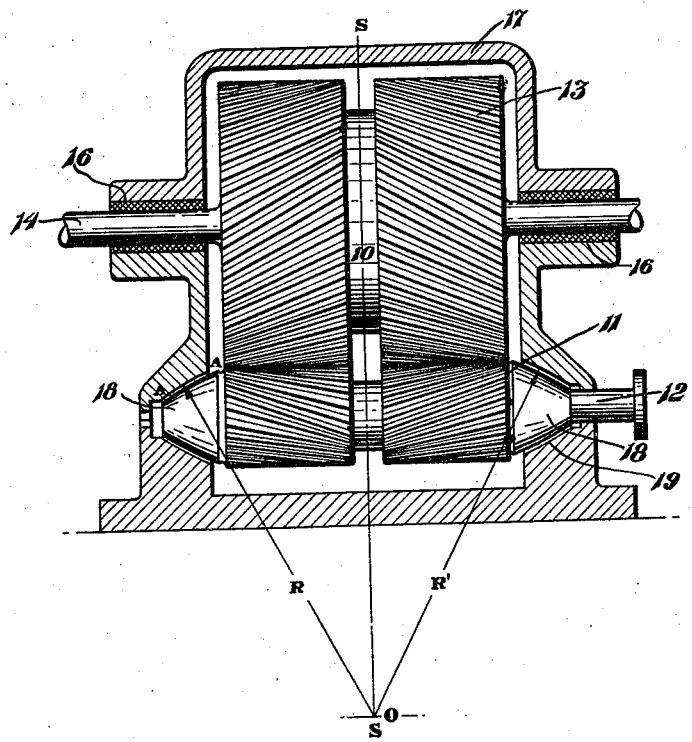
Figure 2:
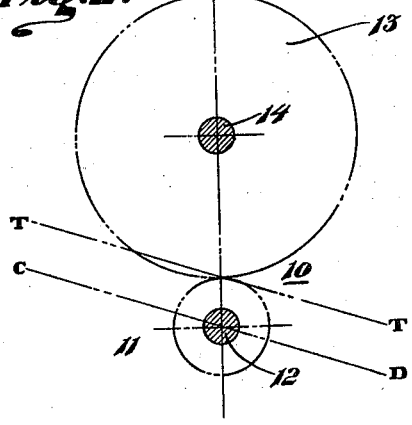

In the accompanying drawing, Fig. 1 is a view, partially in section and partially in elevation, of a gear train embodying my invention, and Fig. 2 is a diagrammatic representation, viewed from the end, of a gear train such as is shown in Fig. 1.

In the operation of reduction gearing, particularly where large powers are transmitted with a considerable reduction in speed, it is highly desirable that the tooth pressures be evenly distributed to avoid the disastrous results to the teeth and the bearings arising from localized tooth pressures, whether due to misalinement, incorrect cutting, or any other cause.

With the above and other objects in view, I have devised a structure wherein one of the intermeshing gear members is supported in bearings of such a type as to permit it to tilt in response to any unbalanced forces, so that tooth pressures may be equally distributed. As such tilting sets up forces tending to produce a concurrent axial shifting, I also provide for a free axial movement of the other gear member, to the end that it may follow the axial movement of the tilting member and thereby maintain alinement of the gear members with respect to their axes of symmetry.

Still other structural features of my invention will be apparent from the subjoined description.

Referring to Fig. 1 of the drawing for a more detailed understanding of my invention, I indicate at 10 a reduction gear train consisting of a driving pinion 11, mounted on a driving shaft 12, meshing with a driven gear 13, mounted on a driven shaft 14 and journaled in the cylindrical bearings 16. Surrounding the gear train 10 is a suitable housing 17 for the purpose of excluding dirt and of retaining lubricant supplied to the gears. The housing 17 also serves as a support for the bearings 16, but it is to be understood that these bearings may be supported in any well known manner.

The pinion 11 is provided at its ends with the conoidal journals 18, mounted in the supporting bearings 19, which are, as shown, supported by the housing 17. The surface of each of the conoidal journals 18 is generated by the revolution, about the axis of the pinion 11, of an arc AA, struck with any desired radius R from a point O. The point O lies in a plane CD, which passes through the axis of the pinon 11, parallel to the plane of action TT of the teeth of the pinion 11. The point O is also located in a plane of symmetry SS of the gear train 10. The conoidal bearings 19 are similar to and cooperate with journals 18, their radius R' being slightly longer than the radius R to provide a small clearance for a purpose hereinafter to appear.

In the operation of my device, the pinion 11 may, by reason of the configuration of the conoidal journals 18 and the associated bearings 19, rock or tilt in the plane CD about the point O as a center, in response to forces set up by concentrated tooth pressures, in a manner well understood in the art to which my invention relates. Such tilting, however, while distributing the tooth pressures, has the effect of causing a shifting of the pinion 11 with respect to the gear 13 so that alinement with respect to their planes of symmetry is disturbed. This misalinement is corrected by virtue of the slight clearance between the journals 18 and their bearings 19, which permits the pinions to shift slightly in an axial direction. The gear 13 is free, by reason of the cylindrical bearings 16, to shift axially in response to the movement of the pinion, following the latter until correct alinement is accomplished, and the load is evenly divided between the gear faces.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. A reduction gear comprising a gear member having two rows of opposed, helical teeth, a pinion member having two rows of helical teeth meshing with the gear member teeth, and means for directing a tilting of the pinion in a plane parallel to the plane action of the meshing teeth to evenly distribute tooth pressures.

2. A reduction gear comprising a gear member and a pinion member, each having opposed helical teeth adapted to intermesh, journals for the pinion member, and bearings for the journals so disposed with respect thereto that any tilting of the pinion member is directed in a plane parallel to the plane of action of the meshing teeth to evenly distribute tooth pressures.

3. In combination with a reduction gearing comprising a gear and a pinion, each provided with intermeshing, opposed helical teeth, journals for the pinion, bearings for the journals so disposed with respect thereto that the pinion may move axially and that any tilting of the pinion for effecting the even distribution of tooth pressures is directed in a plane parallel to the plane of action of the teeth, and means whereby the gear may move axially to follow the axial movement of the pinion.

4. In combination with gearing comprising a gear and a pinion, each provided with intermeshing teeth, means including cooperating journals and bearings so constructed and arranged that the pinion may shift axially and that any tilting of the pinion to evenly distribute tooth pressures is directed in a plane parallel to the plane of action of the teeth.

5. In combination with gearing comprising a gear and a pinion, each provided with intermeshing teeth, journals having curved surfaces on the pinion, and bearings cooperating with the journals so that any tilting of the pinion for effecting an even distribution of tooth pressures is directed in a plane parallel to the plane of action of its teeth.

6. In combination with gearing comprising a gear and a pinion, each provided with intermeshing teeth, journals having curved surfaces on the pinion, and fixed bearings cooperating with the journals, said journals and bearings being so constructed and arranged that any tilting of the pinion to effect an even distribution of tooth pressures is directed in a plane parallel to the plane of action of its teeth and that the pinion may move axially to compensate for the misalinement caused by said tilting.

7. In combination with gearing comprising a gear and a pinion, each provided with intermeshing teeth, journals having conoidal surfaces on the pinion, fixed bearings cooperating with the journals in such manner that any tilting of the pinion in response to localized tooth pressures is directed in a plane parallel to its plane of action and means whereby the gear may shift axially to compensate for misalinement caused by said tilting of the pinion.

8. In combination with a pinion in a train of gears, conoidal journals and cooperating conoidal bearings for the pinion whereby the pinion may tilt in a plane parallel to its plane of action.

9. In combination with a gear train including a pinion, conoidal journals on the pinion, and fixed conoidal bearings cooperating therewith and spaced therefrom to provide a slight clearance, whereby the pinion may tilt in a plane parallel to its plane of action and shift axially to distribute tooth pressures.

10. In combination with a gear train including a pinion, conoidal journals on the pinion having surfaces generated by the revolution about the pinion axis of an arc struck from a point in a plane parallel to the plane of action of the pinion and in the plane of symmetry of the pinion, and similar, fixed conoidal bearings cooperating with the journals and spaced therefrom to provide a slight clearance, whereby the pinion may tilt in the plane parallel to its plane of action to balance tooth pressures, and may shift axially to distribute tooth pressures.

In testimony whereof I have hereunto subscribed my name this 7th day of December, 1921.

IRA SHORT.